United States Patent [19]

Mark et al.

[11] Patent Number: 4,852,597
[45] Date of Patent: Aug. 1, 1989

[54] CRUTCH DESIGN

[75] Inventors: Irving L. Mark; Varun Soni, both of Highland Park, Ill.

[73] Assignee: Medline Industries, Inc., Mundelein, Ill.

[21] Appl. No.: 29,716

[22] Filed: Mar. 24, 1987

[51] Int. Cl.⁴ ............................................. A61H 3/02
[52] U.S. Cl. ...................................................... 135/69
[58] Field of Search ...................... 135/68, 69, 72, 73, 135/84; 403/217, 378

[56] References Cited

U.S. PATENT DOCUMENTS

| | | | |
|---|---|---|---|
| 1,035,760 | 8/1912 | Walton | 135/69 |
| 1,284,351 | 11/1918 | Jagielo | 403/378 |
| 2,453,632 | 11/1948 | Lofstrand, Jr. | 135/69 |
| 4,509,741 | 4/1985 | Smith | 135/69 |
| 4,625,743 | 12/1986 | Harker | 135/68 |

*Primary Examiner*—Robert A. Hafer
*Assistant Examiner*—Charles H. Sam
*Attorney, Agent, or Firm*—Laff, Whitesel, Conte & Saret

[57] ABSTRACT

A crutch having a telescoping section for adjusting its length. The length of the telescoping section is locked by a pair of detents on the inner telescoping tube popping through selected ones of many periodically recurring confronting holes formed in the outer telescoping tube. The upper and lower ends of the outer one of the telescoping tubes are riveted to spaced parallel upright members which form the weight carrying part of the crutch. The lower rivets to do not pass through the entire diameter of the telescoping section. Instead, heads of the rivets form bosses projecting radially inward from diagonally opposed points on the internal perimeter of the outer telescoping tube. The inner telescoping tube has a pair of longitudinal grooves forming tracks which receive and slide over the bosses formed by the rivet heads, for limiting the amount of rotational travel which may be experienced by the inner telescoping tube which cannot rotate far enough for the detent to be completely misaligned with the confronting locking holes. It can rotate far enough to ride over the perimeter of the holes, to enable a quick and easy length adjustment. Thus, as long as the inner telescoping tube is held in a rotated position, the locking detent is forced to pass extremely close to, but not directly over each of the confronting holes. As it so passes, the spring bias of the detent forces it to pass into the locking hole when the inner telescoping tube is released from its rotational position.

12 Claims, 1 Drawing Sheet

U.S. Patent      Aug. 1, 1989      4,852,597
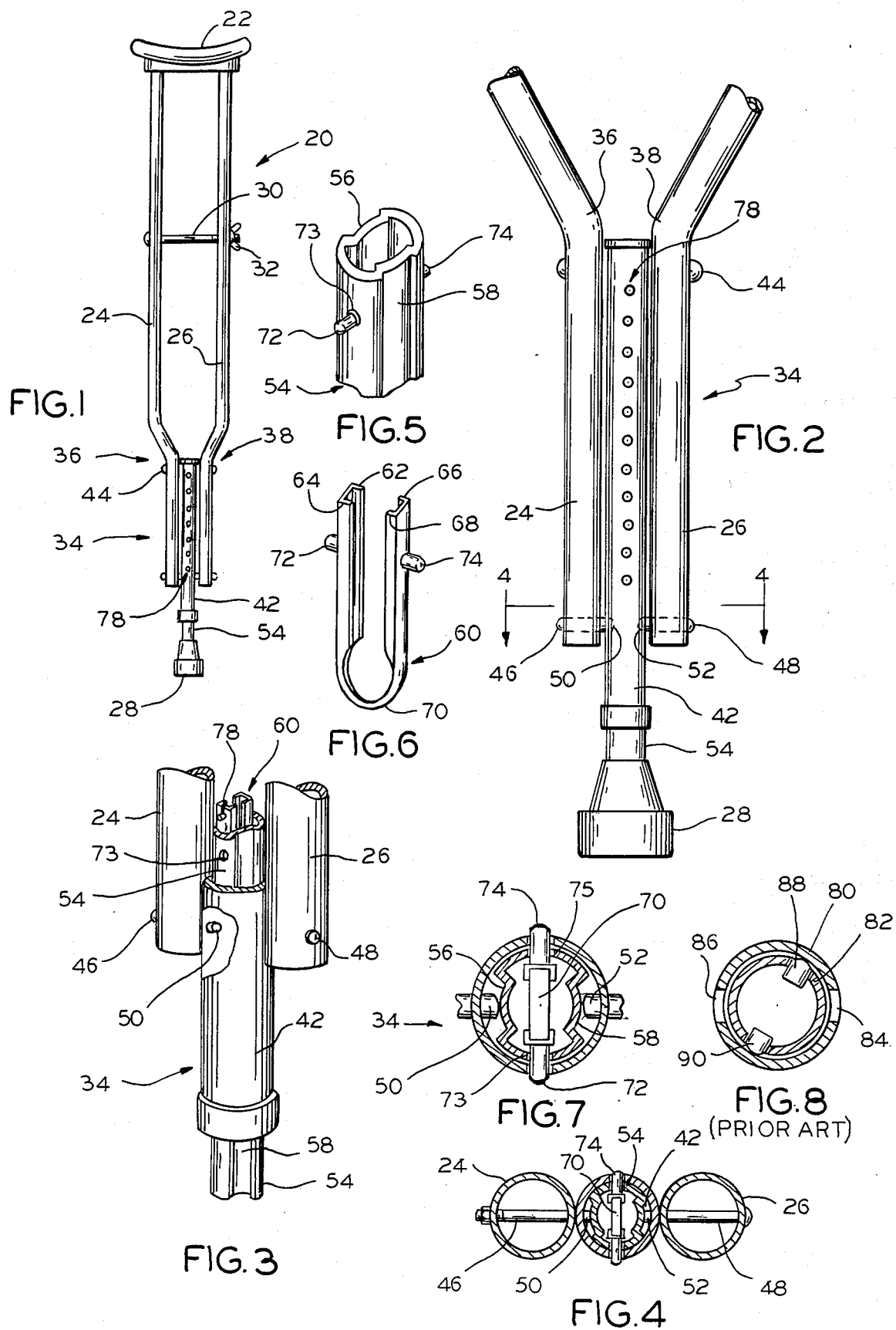

CRUTCH DESIGN

This invention relates to crutches and more particularly to crutches which are vertically adjustable to accommodate persons of different height.

A crutch must have the correct length relative to the height of the user, if it is to be safe and comfortable to use. Therefore, the seller of the crutch must either stock a great variety of crutches having many different lengths or a few crutches having adjustable lengths. The crutch should be very light and strong. Also, the length should be adjustable quickly and easily.

If an adjustable length crutch is provided, the length adjusting mechanism must be able to withstand severe mechanical stress. The stress comes from placing the user's weight on the crutch and then swinging the body weight as a pendulum turning about a fulcrum point at the foot of the crutch. The user may cross a substance, such as mud, or put the crutch tip in a crack or hole which tends to resist the pendulum motion of the user's body. If the foot of the crutch should become wedged in a crack, for example, the swinging body weight exerts a great force upon the foot of the crutch. If an adjustable joint can become loose and wiggle, it probably will do so. If the crutch is used over an extendible period of time, the looseness and wiggling becomes progressively worse, which further loosens the joint.

Reference is made to U.S. Pat. No. 4,509,741, Alfred A. Smith, inventor. The Smith patent shows an adjustable crutch with the foot on the lower end of a pair of telescoping sections. A pair of spring biased detents may be pushed to unlock and telescope a first leg section having the foot. Confronting each of the detents, the mating telescoping section has a series of periodically recurring holes which are formed along its length. The detents are pushed and the telescoping section is slid to a selected location where the detents pop through confronting ones of the holes to lock the length of the telescoping sections and thereby fix the length of the crutch.

A first characteristic of the Smith crutch is that, the telescoping section may be rotated endlessly around 360°. In most of this travel, a rotated telescoping section can move along the entire length of travel that is afforded by the physical configuration of the section. One result is that the detent on a rotated section cannot be seen through the holes, which makes telescopic adjustment slow and cumbersome. This also means that it is easy to be careless when adjusting the length, which might result in the leg of the crutch completely giving way under the weight of a person using the crutch. A result could be a bad fall for the person using the crutch.

Another characteristic of the Smith crutch is that it has an outstanding ledge at the bottom of the weight bearing sections, which may collect dirt and grease. In a hospital where there are germs, virus, etc. this collection becomes a health hazard. This is an especial problem if the user of the crutch has an exposed wound or sore on a leg near the ledge on the crutch.

Accordingly, an object of this invention is to provide new and improved adjustable crutches. Here, an object is to provide a crutch with an adjustment which is less likely to be carelessly left in an unlocked condition. Also, an object is to provide an adjustable crutch which is free of ledges that can collect dirt, grease and germs. Still another object is to retain the easy adjustment which is accomplished by rotating the telescoping leg for movement directly to the selected location, without forcing the detents to pass each of the confronting holes, in a manner which causes the crutch to lock at each location.

Another object of the invention is to provide a more reliably assembled structure which is much less likely to develop looseness as a patient swings his weight on crutches.

In keeping with an aspect of the invention, these and other objects are accomplished by providing a telescoping section for adjusting the length of the crutch. The length of the telescoping section is locked by a pair of detents on the inner telescoping tube popping through selected ones of many confronting holes in the outer telescoping tube. The upper and lower ends of the outer one of the telescoping tubes are riveted to spaced parallel upright members which form the weight carrying part of the crutch. The lower rivets do not pass through the entire diameter of the telescoping section. Instead, heads of the rivets form bosses projecting radially inward from diagonally opposed points on the internal perimeter of the outer telescoping tube. The inner telescoping tube has a pair of longitudinal grooves forming tracks which receive and slide over the bosses formed by the rivet heads. Moreover, the bosses are captured between the walls of the grooves with the relative widths of the bosses and grooves allowing some, but only a limited amount, of rotational travel. The inner telescoping section can not rotate far enough for the detent to be completely misaligned with the confronting locking holes, but it can rotate far enough to ride over the perimeter of the holes, to enable a quick and easy length adjustment. Thus, as long as the inner telescoping tube is held rotated, the locking detent is forced to pass extremely close to, but not directly over each of the confronting holes. As it so passes, the spring bias of the detent forces it to pass into the locking hole as soon as the inner telescoping tube is released from its rotational position. This means that it is impossible for the detent to become misaligned to a degree which could lead to a careless failure to properly lock the telescoping section. Also, the invention provides an arrangement which is free of ledges that can collect dirt, grease, and germs.

An embodiment of the invention is shown in the attached drawing wherein:

FIG. 1 is a side elevation of the inventive crutch;

FIG. 2 is a fragment taken from FIG. 1 and showing the telescoping, length adjustment section;

FIG. 3 is a fragment of FIG. 2, which is broken away to show an internal boss;

FIG. 4 is a cross section taken along line 4—4 of FIG. 2;

FIG. 5 is a fragmentary end view, in perspective, of a central telescoping section of the crutch;

FIG. 6 is a perspective view of a detent used to lock the telescoping sections;

FIG. 7 is a cross sectional view of the telescoping section showing how the inventive crutch is limited in its rotation;

FIG. 8 shows a prior art cross section similar to FIG. 7 to illustrate how the section may rotate in an unlimited manner.

The crutch 20 (FIG. 1) includes an upper, under the shoulder, arm support 22 coupled to two vertical, weight supporting members 24, 26 extending downwardly toward a tip 28 at the foot of the crutch. The vertical members 24, 26 are preferably hollow metal tubes of any suitable cross section, for providing both strength and lightness. A hand hold 30 separates the vertical weight supporting members 24, 26. A long bolt with a wing nut enables the handle 30 to be moved up or down the length of the crutch to provide for the arm length of the individual user.

Near the lower end of the crutch is an adjustable section 34, which is shown in greater detail in FIG. 2. The crutch 20 has a converging pair of angular bends at 36, 38 which bring the vertical, weight supporting tubular members 24, 26 into a spaced parallel relationship along the lower terminal telescoping section. The upper end of a telescoping central tube 42 is secured to the spaced parallel section of the tubular members 24, 26 by a bolt or rivet 44 extending transversely through the three members 24, 26, 42.

FIGS. 2, 3 show how the lower end of the center telescoping tube 42 is secured to the weight supporting vertical members 24, 26. In greater detail, at the top of telescoping section 40 an opposing pair of rivets 46, 48 pass through the entire cross section of the vertical members 24, 26. However, at the bottom of section 34, inside the outer telescoping tube section 42, the heads of the rivets 46, 48 are shaped to form diametrically opposed bosses 50, 52 which project into the interior of the section 42. These bosses are in the form of upstanding collars which provide good bearing surfaces for longitudinal grooves to ride upon.

It should be noted that this design eliminates an outwardly projecting ledge (part 40 in the Smith patent) which is sometimes provided in crutches to tie together the parts 24, 42, 26. Those ledges provide cracks and crevices to collect dirt, grease, and germs, which are especially hazardous if the user has an open wound or sore nearby.

The inside one 54 of the telescoping section 40 includes opposing longitudinal depressions or grooves 56, 58 (FIG. 5) having a configuration which receives and forms tracks in which the internally projecting bosses or heads 50, 52 ride. Thus, the inner telescoping tube 54 is completely free to slide longitudinally as it telescopes into or out of the outer tube 42. However, the inner tube 54 is not free to rotate any substantial amount since it is restrained by the sides of the longitudinal grooves 56, 58 coming to rest against bosses 50, 52. The excursion is such that the locking detent can pass over confronting holes, but not far enough to misalign the detent to a degree where one could carelessly leave the telescoping section in an unlocked condition. An advantage is that the grooves give greater strength to the leg 54 so that it can withstand greater forces as the user swings his body weight on the crutches.

The inner telescoping tube 54 has a pair of diametrically opposed holes formed therein to receive spring biased detents. In greater detail, FIG. 6 shows a U-shaped spring 60 having inwardly turned flanges 62-68 extending along opposing cantilever arms formed by a spring section 70. The flanges 62-68 make the cantilever arms rigid. At the ends of the cantilever arms, are two outwardly projecting, diametrically opposed detents 72, 74. The spring section 70 has a sufficient tension to drive the detents into the confronting locking holes if the central tube is released from its rotated position.

The bight 70 of the U-shaped spring 60 is slipped into the end of the tube 54. Then, the detents 72, 74 are pressed in and the entire assembly, detents included, to pass into the inner telescoping tube 54 far enough for the detents 72, 74 to pop out opposing holes 73, 75 (FIGS. 3, 7) formed in the tube 54. Thereafter, the detents 72, 74 may be pushed against the bias of spring 70 while the inner telescoping tube 54 is slid into the outer telescoping tube 42.

On each of the opposite sides of the outer telescoping tube 42 there is a longitudinal series of periodically recurring holes 78 formed periodically along its length. Each locking hole is shaped and positioned to receive a detent, which pops therethrough to lock the length of the tube. For example, if each of the locking holes is separated from each of its neighboring holes by one-inch, the crutch may be made longer or shorter in one inch increments.

As should be apparent from an inspection of FIG. 7, the guide ways 56, 58 engage and form tracks which ride upon the bosses 50, 52 so that the inner telescoping tube 54 can only rotate relative to the outside telescoping tube by an amount which is permitted by the width of the grooves. Therefore, the detents 72, 74 are never very far from a position where they are forced to confront each hole in the longitudinal series of holes 78. If the inner telescoping tube 54 is rotated slightly and held in the rotated position, it may slide over the full telescoping length, because the detents 72, 74 slide over the perimeter or edges of the holes. The detents confront but cannot pop out through each successive and opposed set of locking holes in the outer tube while the inner telescoping tube 54 is held rotated. Therefore, the inner telescoping 54 can slide directly to a desired position. However, the detents 72, 74, are so close to the locking hole that even the slightest rotation causes them to pop through a pair of confronting locking holes and thereby lock the length of the telescoping section.

The end of the detents 72, 74 are dome shaped, as best seen in FIG. 7. While inner telescoping tube 54 is held in a rotated position and slid, the detents 72, 74 pass very close to the perimeter of the locking holes 78 without passing directly over them, so that the detents cannot pop out through the locking holes.

The bias of spring section 70 is relatively strong. Therefore, if the rotated inner telescoping tube is released while the detent is near a locking hole, the bias of spring 70 drives the dome shaped detent into the locking hole. If a careless person leaves the detents someplace between locking holes, a person putting his weight on the crutch causes it to slide. However, as the detent approaches a locking hole, the spring 70 pushes it into the hole and locks the telescoping part. This means that the tube cannot easily slide further than the distance between adjacent locking holes (or perhaps two locking holes) before the detents pop through confronting holes and the leg 54 is held in the locked position. Thus, the telescoping end of the crutch is positively locked and cannot collapse as a result of careless locking. An advantage is that the detent is always passing close enough to a locking hole so that it is easily seen. Therefore, the adjustment is made very quickly.

Contrast this fail safe operation with the prior art, which is shown in cross section in FIG. 8. Both the outer tube 80 and inner telescoping tube 82 have a circular cross section; therefore, the inner telescoping tube 82 is able to rotate endlessly within the outer tube 80. The outer tube 80 has opposing locking holes 84, 86 formed therein; however, the detents 88, 90 no longer confront the holes (e.g. as here shown) the inner telescoping tube 82 has rotated by almost 90°. This means that a user adjusting this prior art crutch cannot see the detent in FIG. 8 and therefore has to fumble with the adjustment in order to find and align the detents with the proper locking holes. The adjustment is very likely to be much more time consuming than it is with the invention. Moreover, if the user puts his weight on this prior art crutch while the inner telescoping tube 82 is so rotated relative to the outer tube 80, the detents 88, 90 do not confront the locking holes 84, 86. Therefore, the telescoping part of the crutch will almost certainly give way and collapse under the weight of the user.

It is irrelevant why the inner telescoping tube 82 may be rotated relative to the outside tube. Perhaps the user failed to firmly lock the tubes in place, after the height adjustment was made. Perhaps the foot 28 of the crutch is caught in a crack or hole and the users weight forced it to rotate. However, regardless of why, the over rotation of the prior art inner telescoping tube 82 would very likely result in a complete collapse of the prior art crutch, while the inventive crutch is positively prevented from rotating far enough to insure a complete failure to be locked under the weight of the user. Quite the contrary, it is extremely likely that an automatic locking will occur.

Those who are skilled in the art will readily perceive how to modify the invention. Therefore, the appended claims are to be construed to cover all equivalent structures which fall within the true scope and spirit of the invention.

The claimed invention is:

1. A crutch comprising a pair of vertical weight bearing support members with uniform cross section extending from an under arm support to a terminal telescoping section, said members and terminal section being joined to form a crutch, said telescoping section comprising an outer telescoping tube having at least one row of periodically recurring holes formed therein, an inner telescoping tube having at least one spring biased detent confronting said row of holes for popping through and locking into a selected one of the holes in said row, thereby fixing the length of said telescoping section, and means associated with said telescoping tubes for limiting the rotational excursion of said inner and outer telescoping tubes relative to each other, said limited rotational excursion positioning said detents relative to said holes so that said detent slides past said holes, but the detent remains close enough to the holes for said spring bias to push said detent into a selected one of said hole for automatically locking the telescoped position upon release of said rotation, whereby said limited rotationally excursion provides means for enabling said inner telescoping tube to slide past all of said holes in said row for length adjustment purposes while the spring bias tends to limit the telescoping motion responsive to weight applied to unrotated tubes of said crotch, the limited telescoping motion being approximately a distance between an adjacent two of said holes.

2. The crutch of claim 1 wherein said means for limiting a rotation of said inner telescoping tubes comprises a guide channel formed in one of said telescoping tubes and a boss formed on the other of said tubes for riding in said guide channel to prevent a rotation beyond said limited excursion of said tubes relative to each other.

3. The crutch of claim 2 wherein said telescope limiting means is the action of said detent riding over the perimeter of said holes when said inner telescoping tube is held in a position of maximum rotation permitted by an interference between said boss and said guide channel, and said spring bias pressing said detent against said perimeter of said hole for forcing said detent through a confronting one of said locking holes when said inner telescoped tube is released from said rotation position, the end of said detent which first passes through said locking hole having a shape for guiding and directing said detent through said confronting locking holes under the force of said spring bias.

4. The crutch of claim 1 wherein said inner telescoping tube has spaced parallel grooves running along diametrically opposed sides thereof, diametrically opposed bosses projecting inwardly toward the center of said inner telescoping tube, said bosses fitting within said grooves whereby said bosses and grooves cooperate with each other to form said means for preventing an unlimited rotation of said telescoping tubes relative to each other.

5. The crutch of claim 4 wherein there are two of said rows of periodically recurring locking holes extending along diametrically opposed sides of said outer telescoping tube, and there are two of said spring biased detents in said inner telescoping tubes, each of said detents confronting an individually associated one of said rows of holes, the detents having a shape which guides and directs said detent through a locking hole under the force of said spring bias.

6. The crutch of claim 5 and a U-shaped spring having a size and shape which slides into said inner telescoping tube, an outwardly directed detent mounted on each leg of said U-shape to project outwardly and away from the axis of said inner telescoping tube, said detents extending outwardly beyond the outside perimeter of said inner telescoping tube under the spring tension of said U-shape.

7. A crutch made from metal tubes comprising first and second load bearing tubes having a substantially uniform cross section throughout their entire length extending from a first end to a second end, and under arm support for joining the first ends of said metal tubes, said first and second tubes being angularly offset to bring said first and second tubes into a spaced parallel relationship along a substantial section at said second end, a pair of telescoping tubes positioned between and joined to said load bearing tubes in said spaced parallel sections at second end, joining means between a lower part of each tube in said parallel section and said telescoping tubes comprising a pair of fasteners extending through individually associated ones of said first and second load bearing tubes and ending in bosses projecting radially into the interior of an outer telescoping tube, the inner telescoping tube having longitudinal grooves shaped and proportioned to receive said bosses in order to enable a telescoping of said inner and outer tubes with only a limited amount of rotation relative to each other, and locking means comprising at least one longitudinal row of periodically recurring holes in the outer telescoping tube and a confronting spring biased detent in the inner telescoping tube for locking the telescoping tubes in a selected location the amount of said limited rotation enabling said inner tube to slide freely within said outer tube while also released.

8. The crutch of claim 7 and a load bearing elastomeric foot mounted on the lower end of the inner telescoping tube to engage a supporting surface upon which a person using the crutch may be standing or walking.

9. The crutch of claim 8 wherein there are two diametrically opposed longitudinal rows of locking holes in said outer telescoping tube, and there are two of said spring biased detents, each of said detents being individually associated with a corresponding row of said holes, said spring bias providing the energy for causing said inner tube to return from said limited rotation and for causing said automatic locking.

10. The crutch of claim 9 wherein said detents project outwardly from the ends of arms of a U-shaped spring which is pushed into an end of said inner telescoping tube, the ends of said detents being shaped to be forced through a confronting one of said locking holes by the force of said spring bias when said inner telescoping tube is released from said limited rotation.

11. The crutch of claim 7 wherein said telescoping tube is joined to said lower part of said spaced parallel section without any outstanding ledges which might collect dirt, grease or germs.

12. An adjustable crutch comprising a supporting structure having a telescoping section joined thereto with at least an outer and an inner section for making length adjustments, length locking means, said inner section having at least one longitudinal groove therein said outer section having at least one boss projecting inwardly into said groove for providing a limited rotation so that said inner section may slide smoothly and without interruption over the range of possible length adjustments and without concealing said locking means from view, and means responsive to release of said limited rotation for automatically locking of the length of the crutch.

* * * * *